US005195109A

United States Patent [19]

Bochmann et al.

[11] Patent Number: 5,195,109

[45] Date of Patent: Mar. 16, 1993

[54] DIGITAL RADIO RECEIVER WITH PROGRAM-CONTROLLED MIXING OSCILLATOR FREQUENCY

[75] Inventors: Harald Bochmann, Hannover; Henrik Schulze, Peine; Joachim Hagenauer; Peter Höher, both of Seefeld, all of Fed. Rep. of Germany

[73] Assignee: Blaupunkt-Werke GmbH, Fed. Rep. of Germany

[21] Appl. No.: 650,042

[22] Filed: Feb. 4, 1991

[30] Foreign Application Priority Data

Feb. 2, 1990 [DE] Fed. Rep. of Germany ....... 4003082

[51] Int. Cl.[5] .......................... H04B 7/10; H04L 1/02

[52] U.S. Cl. .................................. 375/100; 455/161.1

[58] Field of Search ........................ 375/100, 1, 97, 75, 375/38; 455/161, 165, 164, 168, 171, 173, 183, 161.1, 164.1, 168.1, 165.1, 171.1, 173.1, 183.1

[56] References Cited

U.S. PATENT DOCUMENTS

| | | | |
|---|---|---|---|
| 4,349,915 | 9/1982 | Costas | 375/100 X |
| 4,479,215 | 10/1984 | Baker | 375/100 X |
| 4,616,364 | 10/1986 | Lee | 375/1 |
| 4,935,940 | 6/1990 | Reindl | 375/1 |
| 5,014,348 | 5/1991 | Boone et al. | 455/165 |

FOREIGN PATENT DOCUMENTS 3440613 4/1986 Fed. Rep. of Germany .

OTHER PUBLICATIONS

Digital Communications, 2nd Edition, by John G. Proakis, McGraw-Hill, New York; copyright 1989, pp. 267-269 and FIG. 4.2.16.

M. Alard & R. Lassalle, "Principles of Modulation & Channel Coding For Digital Broadcasting for Mobile Receivers," Eur. Broadcasting Union Review—Technical No. 224, pp. 47-69 (Aug. 1987).

Information Transmission, Modulation and Noise, 2nd Edition, Prof. Mischa Schwartz, McGraw-Hill, New York; copyr. 1959, 1970; pp. 188-203.

*Primary Examiner*—Curtis Kuntz
*Assistant Examiner*—T. Ghebretinsae

[57] ABSTRACT

A novel receiver for subcarriers in a radio broadcasting system is described, in which the characteristic frequency of the mixing oscillator is varied under program control. An incoming signal from antenna 1 passes through an input stage 2 to a mixing stage 3. Mixing stage 3 receives the output of an oscillator 4. The output of the mixing stage passes into an intermediate frequency filter stage 5, which preferably includes A/D converters 13 and demultiplexers 14. Stage 5 feeds a plurality of demodulators 6, which may include equalizers 12. Buffer memories 7 store information from demodulated subcarrier signals, and feed an evaluation unit 8. Evaluation unit 8 has a first output which drives a speaker 9 and a second output which is applied to a memory 11. A control unit 10, connected to the output of memory 11, controls the frequency generated by mixing oscillator 4. This system facilitates digital signal transmission by compensating for poor transmission conditions which would otherwise cause serious drop-outs in the digital signal.

2 Claims, 1 Drawing Sheet

DIGITAL RADIO RECEIVER WITH PROGRAM-CONTROLLED MIXING OSCILLATOR FREQUENCY

CROSS-REFERENCE TO RELATED PATENT DOCUMENT

German Application DE-OS 34 40 613, THEILE, publ. Apr. 10, 1986.

CROSS-REFERENCE TO RELATED LITERATURE

INFORMATION TRANSMISSION, MODULATION AND NOISE, 2nd Edition, Prof. Mischa Schwartz, McGraw-Hill, New York; copyr. 1959, 1970; pages 188–203.

DIGITAL COMMUNICATIONS, 2nd Edition, by John G. Proakis, McGraw-Hill, New York; copyright 1989, pages 267–269 and FIG. 4.2.16.

FIELD OF THE INVENTION

The present invention relates generally to digital radio receivers, and, more particularly, to an improved receiver whose mixing oscillator frequency is under program control.

BACKGROUND

The increasing popularity of the compact disk (CD) as an audio recording medium, on the tracks of which pieces of music, after being digitized, are successively stored one bit at a time, has also raised the question of broadcasting radio transmissions digitally, in other words of modulating the carrier associated with the transmitter by using binary signals.

In seeking answers to this question, the influence upon a digital signal of propagation problems of radio transmission carriers, and above all of radio reception at various locations by a car radio installed in a vehicle, must be properly taken into account.

The signal strength of a carrier at a particular location is determined both by the distance from the transmitter and by multipath reception capabilities; these capabilities can vary greatly, even over short distances. The resultant fluctuations in signal strength for car radio reception of the transmitter may be great enough to produce a momentary loss of receiving capability. In binary signal transmission, this means that bit streams of variable length will be missing, which is perceived as a major disturbance, although in analog signal transmission such an interruption would be perceived as only minor interference. The disturbance in reception is also frequency-dependent, because of the multipath characteristics.

THE INVENTION

In view of the known prior art, the particular object of the invention was to design a car radio with devices to counteract the consequences of reduced ability to receive signals from a transmitter.

Briefly, a digital radio receiver for the above-VHF band has a program-controlled mixing oscillator frequency that is cyclically variable by predetermined frequency differences. Demodulators for subcarriers modulated upon the carrier signal are connected to the intermediate frequency filter stage, and the binary signals demodulated from the subcarriers can be stored temporarily in read/write memories. The control circuit for the mixing oscillator includes a memory for the frequency changes to be performed at the hop or transition to the next cycle or time slot, and the cycle or time slot duration is long compared with the duration of a binary signal period.

DRAWING

The single drawing FIGURE describes an exemplary embodiment of the invention.

DETAILED DESCRIPTION

Figure 1:
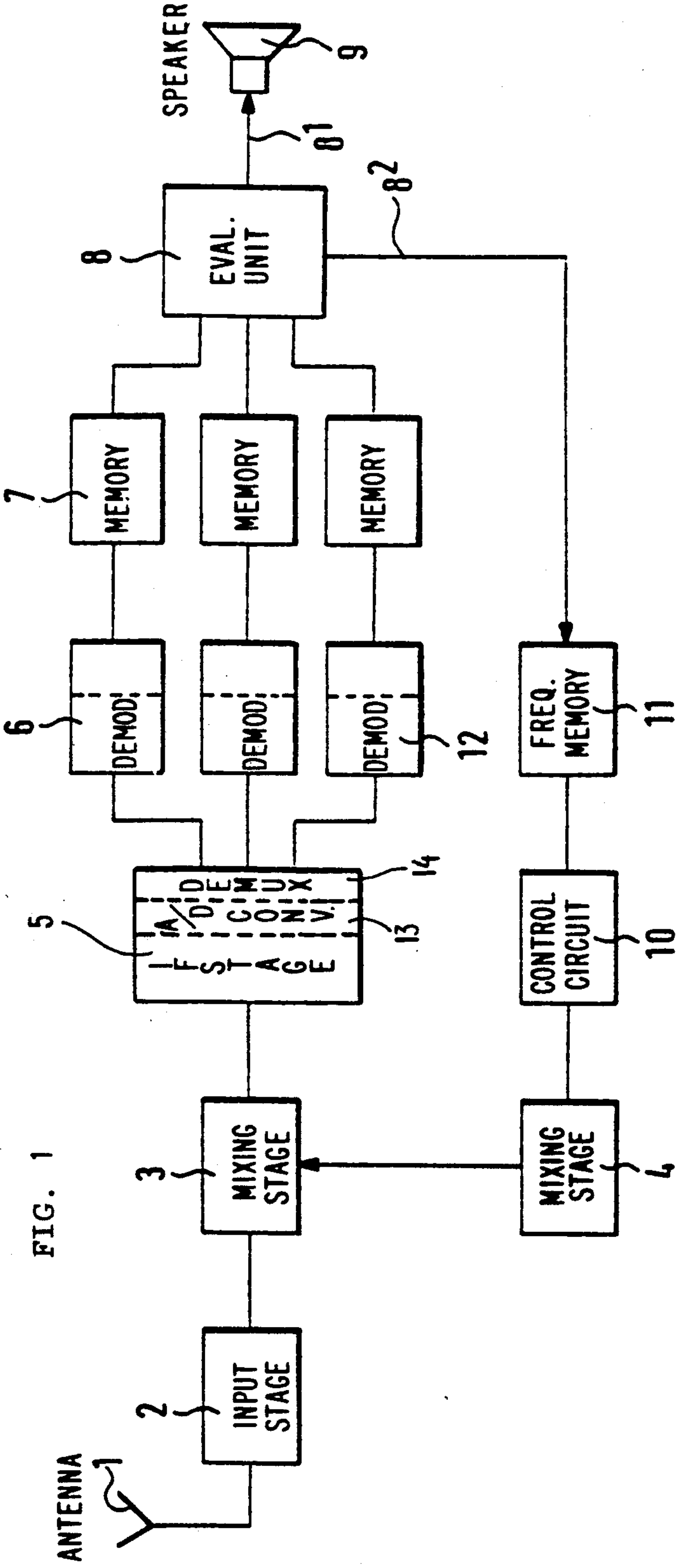

FIG. 1 illustrates a novel receiver for radio transmissions, which is suitable as a car radio, which is connected to an antenna 1 dimensioned suitably for receiving a carrier of a transmitter sending above the VHF band. The output of the input stage 2 of the car radio leads to a mixing stage 3, which is connected to a mixing oscillator 4. A suitable oscillator 4 is model no. SP 2002 from Plessey. The input stage may be of the kind typically used in television receivers. An intermediate frequency filter 5 is connected to the output of the mixing stage 3. A suitable filter 5 is model SFE 10.7 MA5 from Murata. This intermediate frequency filter 5 has a plurality of outputs, to which demodulators 6 for the subcarriers contained in the intermediate frequency signal are connected. Each of the demodulators 6 is tuned to a different multiplex subcarrier assigned to it.

The signals demodulated by the subcarriers in the demodulator 6 are temporarily stored in read/write memories 7. A suitable memory is model TC 55 465 from Toshiba. Connected to this group of buffer memories 7 is an evaluation unit 8, which has an output 8$^1$ at which the signal for the loudspeaker 9 can be picked up. Suitable evaluation units include the Viterbi decoder model SQR 5053 from SOREP, the model PCM 55 from Burr-Brown, or an audio decoder as described in German Published Application DE-OS 34 40 613, THEILE.

The characteristic frequency of the mixing oscillator 4 is variable by means of a control circuit 10, which may be, for example, the integrated circuit SN 74 LS 161. The characteristic frequency undergoes compulsory variation at certain time intervals, or in other words cyclically. The standard for the change in the characteristic frequency from one cycle to another is contained in a memory 11. A suitable memory is EPROM model 2716 from NEC.

In the exemplary embodiment described here, memory 11 has an input that is connected to a further output 8$^2$ of the evaluation unit 8. The magnitude of the frequency change to be made upon the transition to the next cycle, if it is contained in the transmitted signal, can be picked up at this output.

However, the predetermined frequency differences may also be stored in the memory 11 in the form of a table and called up from it by the control circuit 10.

This type of receiver is part of a transmission system that compensates for the consequences of reduced reception capability as follows: The point of departure is a digital representation of an analog microphone signal. As a general rule, the sampling rate of the microphone signal is selected to be at least twice as high as the highest frequency to be transmitted. At the same time, the number of binary digits used to represent the instantaneous value can be selected to be no higher than the number that, multiplied by the duration of one bit, can be transmitted between two successive sampling instants.

As a rule, however, higher sampling rates and shorter bit durations than required by the above conditions are selected. The duration of one bit must, on the one hand, not be selected to be so short that, in serial transmission, the differences, amounting to up to 100 microseconds, in transit time in the later multipath reception between the signals arriving at the antenna over the various paths would substantially impair recognition of the binary signals; in other words, the duration of one bit must suitably be long, compared with the time during which not all the "multipaths" are at the same level (high or low) and thus are still transmitting different values to the antenna.

By selecting a plurality A of subcarriers, A bits can now be transmitted in parallel. The available transmission time for each bit is thus greater by a factor of A than in serial bit transmission. If the number is sufficiently high, then supplemental information, needed for controlling the receiver status, for instance for synchronizing purposes, can be inserted between each two sampling values as well.

By varying the characteristic frequency of the mixing oscillator, the receiver can be switched to a different frequency without having to change the intermediate frequency filter or the evaluation circuit. This change in frequency, which naturally must be effected synchronously in both the transmitter and receiver, has the effect of shifting the transmission of a signal to a different frequency range for a certain period of time. This is advantageous if a certain frequency range exhibits major interference because of multipath reception conditions at the receiving location, at a time when other frequency ranges are exhibiting less interference. The receiver of the exemplary embodiment is particularly flexible to manipulate, because it can infer the magnitude of the next frequency jump or hop from the received signal itself.

A change in reception conditions occurs especially often in a receiver installed in a moving vehicle. This means that the receiver according to the invention is particularly suitable as a car radio.

The cycling times, in other words how long the receiver remains at a particular frequency, and thus how long the transmitter remains at that frequency, must be selected to be long enough that the evaluation circuit 8, and the equalizers that may possibly be provided, can respond, and long enough that interference from the additional modulation of the subcarriers arising from the switchover will remain slight, compared with modulation by the bits. Experience has shown that no fewer than 100 bits should be transmitted during one cycle. For modulation of the subcarriers, the known methods of PSK (phase shift keying), DPSK (differential phase shift keying), QPSK (quadrature phase shift keying), FSK (frequency shift keying) or MSK (minimum shift keying), among others, are suitable. See the Schwartz text, cited above. If the various echo transit times over the "multipaths" are very long, it may be suitable to provide equalizer circuits 12 at the inputs to the demodulators 6. A suitable equalizer 12 is model LCC 44, and a suitable demodulator 6 is described in the Proakis text pages cited at the beginning of the specification. These equalizers can then be adjusted by means of training sequences that are inserted into the transmitted signal.

Suitably, the intermediate frequency filter 5 is completed with an A/D converter 13 and a frequency demultiplexer 14, so that splitting of the intermediate frequency block into the various subcarrier ranges already occurs on the digital level. A suitable A/D converter is model no. HS 10 68 C from Sipex. Preferably, demultiplexer 14 includes a Finite-Impulse-Response (FIR) digital filter for each demultiplexed subchannel.

In a broadcast radio system with a plurality of programs, the various programs to be broadcast can exchange channels with one another, in synchronism, upon the change of frequency. As a result, an overall increase in the requisite receiver bandwidth in practical operation is unnecessary.

Various changes and modifications may be made, and features described in connection with any one of the embodiments may be used with any of the others, within the scope of the inventive concept. Suitable carrier frequencies used in Germany are as follows (subchannels spaced in increments of 0.0512 $Hz = 2^9 \times 10^{-4}$):

| FREQUENCY BLOCK NO. | MEGAHERTZ |
|---|---|
| 1 | 221.0 |
| | 221.0512 |
| | 221.1024 |
| | 221.1536 |
| | 221.2048 |
| | 221.2560 |
| | 221.3072 |
| 2 | 222.0 |
| | 222.0512 |
| | 222.1024 |
| | 222.1536 |
| | 222.2048 |
| | 222.2560 |
| | 222.3072 |
| 3 | 223.0 |
| | 223.0512 |
| | 223.1024 |
| | 223.1536 |
| | 223.2048 |
| | 223.2560 |
| | 223.3072 |
| 4 | 224.0 |
| | 224.0512 |
| | 224.1024 |
| | 224.1536 |
| | 224.2048 |
| | 224.2560 |
| | 224.3072 |
| 5 | 225.0 |
| | 225.0512 |
| | 225.1024 |
| | 225.1536 |
| | 225.2048 |
| | 225.2560 |
| | 225.3072 |
| 6 | 226.0 |
| | 226.0512 |
| | 226.1024 |
| | 226.1536 |
| | 226.2048 |
| | 226.2560 |
| | 226.3072 |
| 7 | 227.0 |
| | 227.0512 |
| | 227.1024 |
| | 227.1536 |
| | 227.2048 |
| | 227.2560 |
| | 227.3072 |
| 8 | 228.0 |
| | 228.0512 |
| | 228.1024 |
| | 228.1536 |
| | 228.2048 |
| | 228.2560 |
| | 228.3072 |

We claim:

1. A frequency division multiplex receiver for radio broadcast signals transmitted digitally over a frequency-hopping carrier signal whose frequency remains constant during a time slot between each two hops, comprising a control circuit (10), which controls which frequency is tuned for reception, during each time slot, by means of an output;

a mixing oscillator (4) having an input, connected to said output of said control circuit (10), and an output;

an input stage (2) with an input adapted for connection to an antenna (1);

a mixing stage (3) having two inputs, a first one of which is connected to an output of the input stage (2);

an intermediate frequency filter stage (5) operating at a constant intermediate frequency, and including a demultiplexer (14) having a plurality of outputs;

a plurality of demodulators (6), each connected to a respective one of said outputs of said demultiplexer (14);

a plurality of memories (7), each connected to a respective output of one of said demodulators (6); and an evaluation unit (8), having a plurality of inputs, each connected to a respective output of one of said memories, and a data output (82) coupled to an input of said control unit (10); wherein said output of said mixing oscillator (4) is connected to a second input of said mixing stage (3), said oscillator being cyclically variable in its characteristic frequency by predetermined frequency differences, and thereby translating a plurality of sequentially different carrier signal frequencies to said constant intermediate frequency;

said demodulators (6) each process a respective multiplex subcarrier modulated upon the carrier signal and derive therefrom binary signals demodulated from the subcarriers;

said memories (7) temporarily store said binary signals;

said evaluation unit (8) reads said binary signals and synchronously tracks changes in said carrier signal frequency and signals, on its data output, to said control unit to perform a frequency hop;

whereupon said control circuit (10) retrieves a next frequency, to be used during the time slot after the hop, from a frequency memory (11) and directs said mixing oscillator (4) to change its characteristic frequency to provide, to said mixing stage (3), a signal which will translate said next frequency to said constant intermediate frequency; and wherein the duration of each time slot is long compared with the duration of a binary signal period.

2. The receiver of claim 1, wherein said mixing oscillator control circuit (10) has an input connected to the output of said frequency memory (11) containing a set of carrier frequencies, which memory in turn has an input connected to said data output ($8^2$) of said evaluation unit (8), which evaluates the received demultiplexed carrier signal for indications of an impending carrier frequency change and triggers retrieval, from said memory (11), of a next carrier frequency.

* * * * *